United States Patent [19]

Schandl et al.

[11] Patent Number: 5,264,979
[45] Date of Patent: Nov. 23, 1993

[54] MOUNTING ARRANGEMENT FOR A MAGNETIC HEAD IN A TAPE RECORDER

[75] Inventors: Hartmut Schandl, Vienna, Austria; Fritz Weisser, St. Georgen, Fed. Rep. of Germany

[73] Assignee: Deutsche Thomson-Brandt GmbH, Fed. Rep. of Germany

[21] Appl. No.: 907,255

[22] Filed: Jul. 1, 1992

[30] Foreign Application Priority Data

Dec. 16, 1989 [DE] Fed. Rep. of Germany ....... 3941594

[51] Int. Cl.$^5$ ........................... G11B 5/56; G11B 21/24
[52] U.S. Cl. ..................................... 360/109; 360/104
[58] Field of Search ............................. 360/109, 104

[56] References Cited

U.S. PATENT DOCUMENTS

| | | | |
|---|---|---|---|
| 3,978,522 | 8/1976 | Rothlisberger et al. | 360/109 |
| 4,158,212 | 6/1979 | Dattilo | 360/109 |
| 4,340,919 | 7/1982 | Kato | 360/109 |
| 4,507,696 | 3/1985 | Hütter | 360/109 |
| 4,550,352 | 10/1985 | Nakao | 360/109 |
| 4,589,040 | 5/1986 | Kawase | 360/109 |
| 4,646,181 | 2/1987 | Morigaki | 360/104 |
| 4,847,714 | 7/1989 | Kamatsu | 360/109 |
| 4,875,123 | 10/1989 | Kang | 360/109 |
| 5,146,377 | 9/1992 | Baheri | 360/109 |

OTHER PUBLICATIONS

Patent Abstracts of Japan, vol. 10, No. 48 (P-431) (2105) 25 Feb. 1986, & JP-A-60 193120 (Sony KK) 1 Oct. 1985.

*Primary Examiner*—John H. Wolff
*Assistant Examiner*—Craig A. Renner
*Attorney, Agent, or Firm*—Joseph S. Tripoli; Joseph J. Laks; Harvey D. Fried

[57] ABSTRACT

A support for supporting an integrated head in a tape record/play device has two degrees of freedom for adjusting the head in orthoginal directions and includes stops for adjustably holding the head above a base plate. The support includes a carrier plate having a substantially flat leaf spring portion and a lateral end integral therewith for mounting the carrier plate in the support. The leaf spring portion provides a degree of freedom in one of the two directions. A substantially U-shaped spring has a fixed leg coplanar with and substantially normal to the leaf spring portion and a free leg for providing a degree of freedom in a second of the two directions. The integrated head is attached to the free leg whereby the head is independently adjustable in the orthogonal directions by flexing the leaf spring and the substantially U-shaped spring.

8 Claims, 3 Drawing Sheets

MOUNTING ARRANGEMENT FOR A MAGNETIC HEAD IN A TAPE RECORDER

CROSS-REFERENCES TO RELATED APPLICATIONS

This is a continuation of PCT application PCT/EP 90/02098 filed Dec. 5, 1990 by Hartmut Schandl and Fritz Weisser and titled "Drive Chassis For A Magnetic Tape Recorder".

BACKGROUND OF THE INVENTION

It is common to combine the magnetic heads of a tape player/recorder into an integrated head to follow the longitudinal tracks of a magnetic tape. The integrated head is affixed to a carrier plate which is spring mounted on a drive chassis between a head drum and a capstan shaft.

It is well known in the art that the quality of playback and recording using an integrated magnetic head is dependent upon the proper orientation of the integrated head with respect to the tape. Therefore, the carrier plates which support the integrated heads must include facilities for adjusting the angle of inclination, the azimuth and the height of the head with respect to the tape.

The integrated heads of conventional VHS video recorders contain record/playback heads (R/P heads) and an erase head for audio signals in the longitudinal tracks of the magnetic tape. Integrated heads also contain an additional magnetic head (CTL head) to record and playback a control signal (CTL). The control signal serves as a reference signal for the band servo system to phase regulate the tape drive in the playback mode. The control signal is obtained during the recording mode from frame synchronization pulses of a video input signal.

In order to ensure synchronization between the video signals which are recorded in the helical tracks of the magnetic tape and the associated audio signals which are recorded in the longitudinal tracks, and also when playing cassettes recorded on other machines, it is necessary to adjust the X-distance of the integrated head along with the tilt, azimuth and height adjustments. The X-distance is the tape length between the stationary integrated head and a given reference point at the end of the tape looped around the cylinder. The actual X-distance is dependent on the particular recorder system standard; for example, 79.244 mm for a VHS recorder between the CTL head and the reference point at the end of the tape loop. The adjustments can be made electronically using a microprocessor which may be switched into a corresponding operating mode. Such an electronic adjustment process using a microprocessor is described in more detail in DE 35 28 452. Magnetic tape recorders in which the X-distance of the combined head can be adjusted electronically, require, as a result, no additional adjustment capability for the head carrier plate.

It is also known that adjustable-tension compression springs can be used to spring mount the head carrier plates. The springs press the carrier plate against adjustable-height stops whereby the adjustable-height stops create a pre-stress in the respective compression springs. The prestress provides energy needed for the aforementioned adjustments of the integrated head. There are further magnetic tape recorders known in which the capstan shaft is located outside the cassette loaded into the magnetic tape recorder.

SUMMARY OF THE INVENTION

It is the object of the invention to provide a holder for an integrated head which is located between the head cylinder and the capstan shaft of a tape player/recorder. The invention permits mounting the drive chassis with a minimum of effort and also permits adjustments to the angle of inclination azimuth and height of the magnetic tape above the drive chassis to be made simply and accurately. The invention provides a holder for an integrated head which permits the height of the head with respect to the drive chassis to be adjusted. A doubly movable spring system permits the azimuth of the integrated head to be adjustable in one direction and the angle of inclination of the head to be adjustable in another direction normal to the direction of the azimuth adjustment.

The inventive holder includes a carrier plate including a leaf spring. The portion of the carrier plate used to restrain the plate is at a smal tangential angle $\alpha$ in relation to the leaf spring. A second, almost U-shaped, leaf spring is in the middle of the carrier plate. The U-shaped spring is coplanar with and substantially perpendicular to the leaf spring to form a free leg portion of the carrier plate. The integrated head is affixed to the outside of the free leg so that the longitudinal axis of the head is perpendicular to the leg. The springy part of the leaf spring therefore lies in the middle portion of the carrier plate between the two lateral end areas of the plate. This permits the deflection of the carrier plate about an axis which is normal to the center line of the lateral end areas. Also, because the integrated head is supported on the free leg of the U-shaped portion, and because the U-shaped portion is normal to the leaf spring, the integrated head can be moved about an axis parallel to the center line of the lateral ends.

In order to arrange the carrier plate between the head cylinder and the capstan shaft, each of the two lateral end areas of the carrier plate is provided with a guide which is perpendicular to the drive chassis. The guides are provided with adjustable-height stops. The adjustable-height stop which faces the capstan shaft is used to adjust the height of the carrier plate and, thus adjusts the height of the head in relation to that of the magnetic tape. The other adjustable-height stop permits deflection of the leaf spring and, thus, helps adjust the azimuth of the head gap. It is therefore necessary to press the carrier plate against the two height-adjustable stops. This is accomplished, for example, by a compression spring which is preferably mounted on the base of the guide facing the capstan shaft and which is biased in such a way that it is able to press the carrier plate against the two adjustable height stops.

An adjustable straining screw is provided to adjust the angle of inclination of the head for the tape/head contact. This screw enables the spring leg supporting the head to be excursed toward the springy part of the leaf spring which is above the leg.

Corresponding spring forces are necessary to establish respective adjustment ranges for the azimuth and angle of inclination adjustments of the head. In order to be able to store the needed spring forces in the carrier plate during the manufacture of the carrier plate the U-shaped area of the plate is formed so that the legs are not quite parallel. That is, the band varies from 180° by a small angle. Also, the lateral end where the carrier plate is restrained, i.e. the leaf spring portion, is arranged at a small tangential angle. When using thin sheet MUST 3 LGBK material with a thickness of 0.8 mm for the carrier plate, a deviation from the U-shape of approximately 1° to 3° is sufficient. Also, a tangential angle of the restrained lateral end of the leaf spring also of approximately 1° to 3° is sufficient to provide the needed spring forces.

BRIEF DESCRIPTION OF THE DRAWINGS

In the FIGS:

FIG. 2b is a plan view of the head support shown in FIG. 2a.

DESCRIPTION OF THE PREFERRED EMBODIMENT(S)

Figure 1:
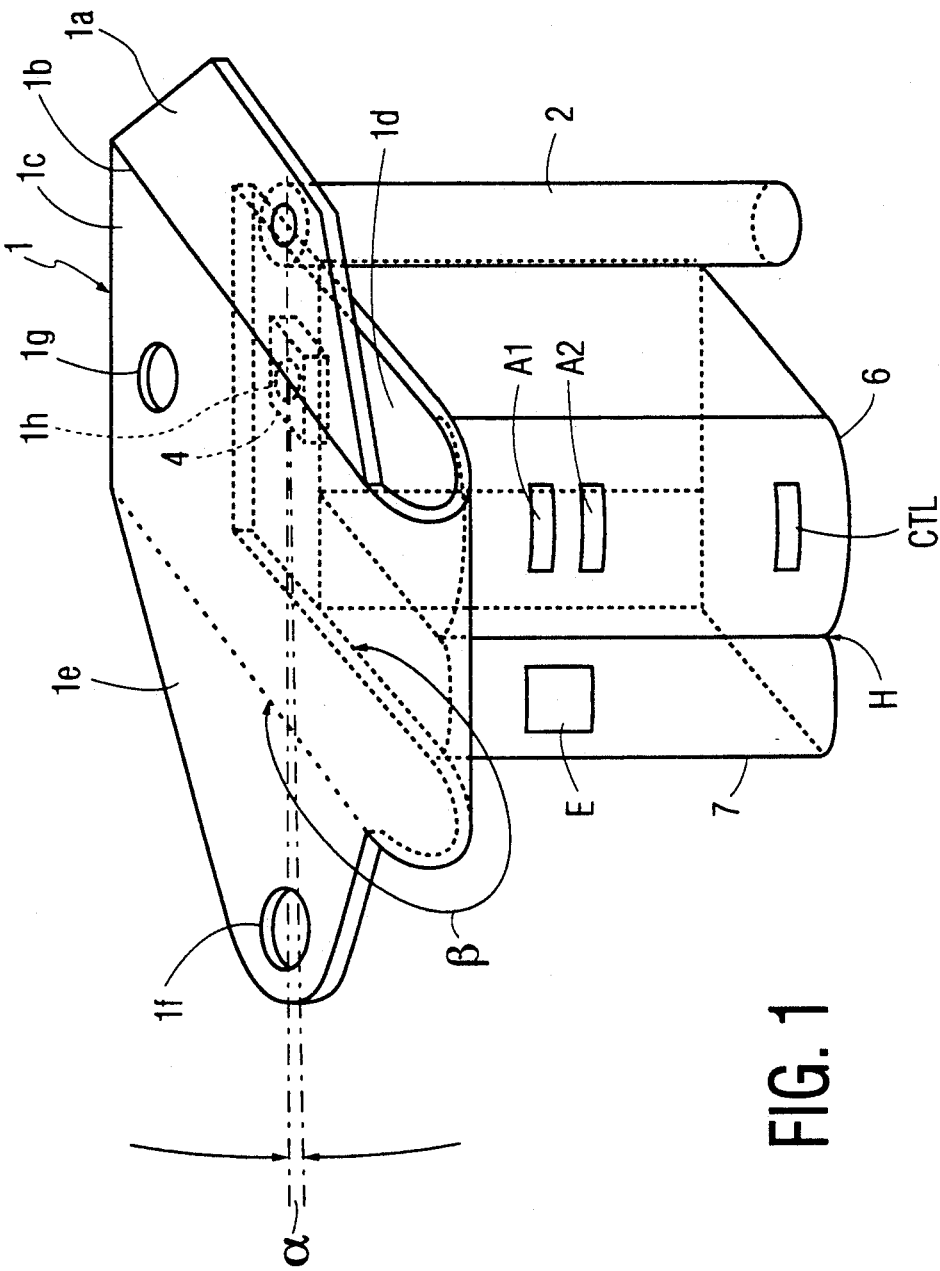
FIG. 1 is a perspective view of a preferred embodiment of a carrier plate for an integrated head for a magnetic tape play/record device.

FIG. 1 is a perspective view of a carrier plate 1 manufactured from 0.8 mm thin sheet MUST 3 LGBK having a first lateral end area 1a, a second lateral end area 1e, and a middle area located between the areas 1a, 1e. The middle area is a substantially U-shaped leaf spring. The bend β in the U-shaped spring differs from 180° by a small angle, which can be positive or negative. The free leg 1d of the U-shaped spring supports an integrated head H for a conventional VHS video recorder. The integrated head H has a first head block 6 and a second head block 7, the respective longitudinal axes of which are perpendicular to the free leg 1d. The arc-shaped side faces of head block 6 and 7 which face the bend are constructed as a head gap side. A control head CTL, which provides reference signals for head cylinder and tape drive, is located in the first head block 6. An audio head A1 and an audio head A2 are also located in head block 6. An audio erase head E is located in head block 7.

The leg 1c, which is opposite to the free leg 1d and the lateral end area 1e, are resilient and form a leaf spring which can be elastically flexed to adjust the azimuth of the integrated head H. In order to permit flexing, the leg 1c includes a bend 1b at an angle α of approximately 1° to 3°. The longitudinal axis of the sliding element 2 is perpendicular to the end area 1a. An elongated hole 1f is arranged in the opposite end area 1e of carrier plate 1 and is used to fasten the carrier plate 1 above the drive chassis 8, similarly to the sliding element 2, as shown in FIG. 2a.

Figure 2A:
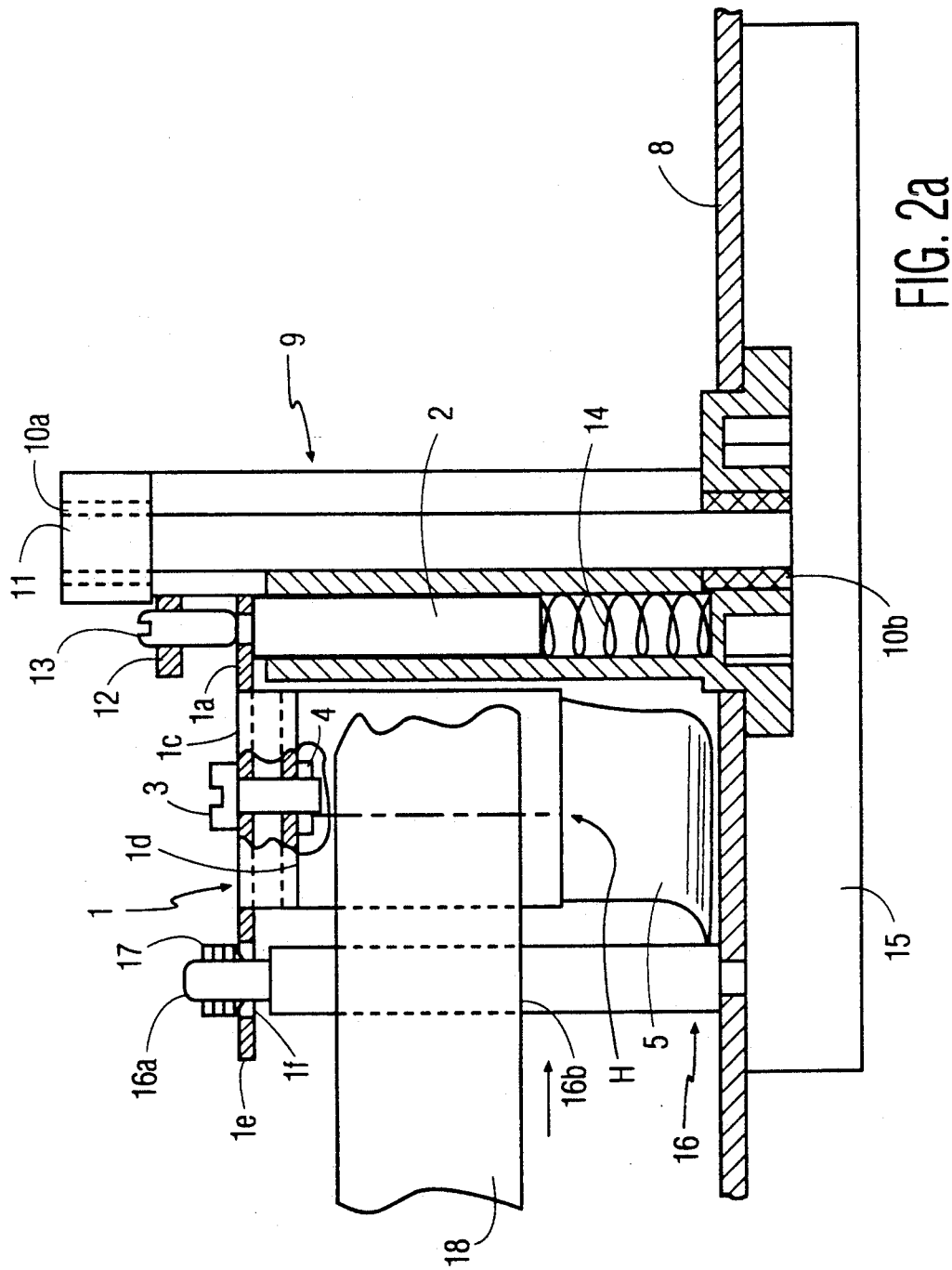
FIG. 2a is a cross section of a head support including the carrier plate shown in FIG. 1.
Figure 2B:
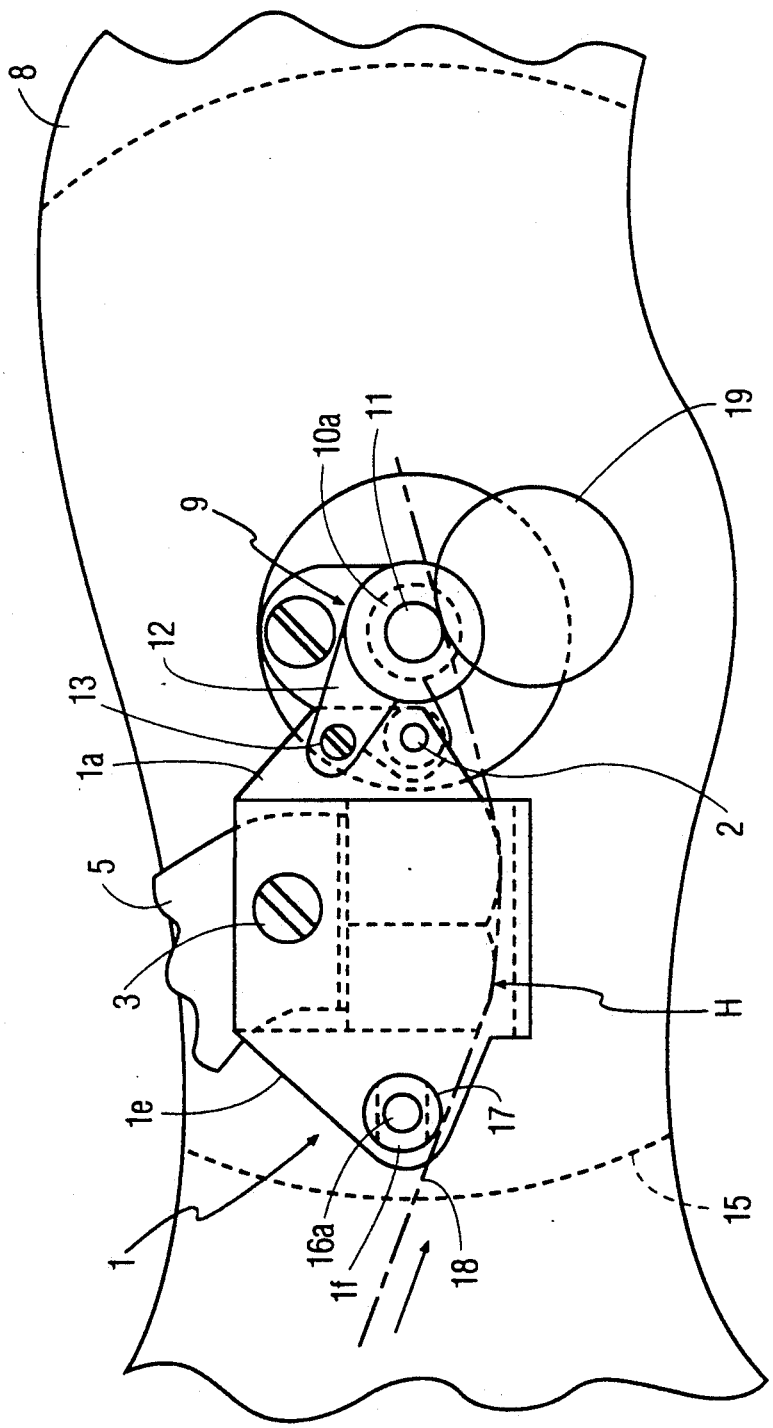

The adjustment of the angle of inclination of the integrated head H can be made by flexing the free leg 1d with respect to the fixed leg 1c by using an adjusting screw 3 (FIGS. 2a and 2b). The screw 3 extends through holes 1g, 1h which are provided in both legs 1c, 1d and is screwed into a nut 4 fitted onto the outside of leg 1d. The range of the adjustment angle for the inclination of the integrated head H is an angle β of approximately 180°±3°, for example 177° to 179° which is the angle of the substantially U-shaped leaf spring in the untensioned condition.

FIG. 2a is a cross sectional side view of a drive in which the X-distance (the distance between the integrated head H and a reference point at the end of a tape looped about the head cylinder) can be adjusted electronically using the carrier plate 1 shown in FIG. 1 with the element shown partly cut away. FIG. 2b shows a schematic plan view of the drive section. The height of the integrated head H is adjusted with respect to the position of the magnetic tape above the drive chassis 8, as well as with respect to the azimuth setting and the tape/head contact.

A capstan motor 15, located on the drive chassis 8, has a capstan shaft 11 which lies outside the tape cassette (not shown) and is mounted in a bearing block 9 having bearing bushes 10a and 10b. A cup-shaped or hollow cylindrical guide is arranged on the bearing block 9 and a sliding element 2 is mounted on a stressed compression spring 14 in the guide. The sliding element is affixed to the first lateral end area 1a of the carrier plate 1. A lateral projection or bracket 12 is formed on the bearing block 9 above the guide and a stud screw 13 is screwed through the projection 12 to engage the carrier plate 1 at the lateral end area 1a and hold the compression spring 14 under compression by sliding element 2. This serves to adjust the integrated head H with respect to the position of the magnetic tape above the drive chassis 8. The tapered lower part of a knurled nut 17, which is used to adjust the azimuth of integrated head H, is in contact with the slotted hole 1f in the end area 1e of the carrier plate 1. The tapered lower part also affects the vertical guiding of the carrier plate 1 in the end area 1e. The knurled nut 17 is screwed onto an upper threaded end piece 16a of a stationary tape deflection pin 16. The tape deflection pin 16 also has a guide flange 16b which vertically guides the magnetic tape 18. The tape deflection pin 16 also counteracts the mechanical longitudinal oscillations in the magnetic tape 18. Such oscillations are generated by rotation of the head cylinder as the result of head cylinder eccentricity, caused by manufacturing tolerances. The oscillations are also caused by the magnetic heads rotating with the head cylinder when they engage the magnetic tape 18 which is looped around the head cylinder. These oscillations would otherwise travel to the integrated head H without attenuation. Longitudinal oscillations have the effect, among other things, of causing oscillations in the audio frequency during playback.

The combined head H is in engagement with the magnetic tape 18. The tape 18 is driven by the capstan shaft working in conjunction with a rubber idler roller (RI roller) 19 in the direction shown by an arrow. A flexible circuit board 5 is connected to the rear of the integrated head. This board makes the electrical connection between the magnetic heads A1, A2, CTL and E (FIG. 1) and also to a signal-processing circuit (not shown). The bearing block 9 with projection 12 and guide can be a one-piece production component.

The energy stored in the compression spring 14 presses the sliding elements against the carrier plate 1 which is then pressed against the stud screw 13. Stud screw 13 is screwed into the projection 12 of the bearing block and serves an adjustable vertical stop. The carrier plate 1 is also pressed against the knurled nut 17 which is screwed onto the end piece 16a of the stationary tape deflection pin 16 to form another adjustable vertical stop. The energy stored in the compression spring 14 is composed of a first component, which is determined by the distance that the stud screw 13 is screwed into the projection 12 of the bearing block 9, and a second component which is determined by the vertical position of the projection 12 of the bearing block 9.

The azimuth and height adjustments of integrated head H occur in a first plane which is perpendicular to the drive chassis 8. The angle of inclination adjustment of integrated head H occurs in a second plane which is perpendicular to the first plane and to the drive chassis 8.

In addition to the simple assembly of the carrier plate 1, the invention provides the advantage that the inclination angle adjustment and the azimuth adjustment are independent and do not influence each other. Also the head H height adjustment, as well as the inclination angle and azimuth adjustments can all be made relatively quickly.

The solution according to the invention is particularly suitable for the drive chassis of magnetic tape recorders operating according to the helical scan method in which the capstan shaft is located outside a cassette loaded in the drive and in which the adjustment of the respective stationary combined head with respect to the X-distance can be performed electronically.

We claim:

1. A mounting arrangement, comprising:
    a drive chassis;
    a stationary magnetic head;
    a carrier plate disposed on said drive chassis and having:
        a central part;
        first and second end areas on each lateral side of said central part, said first end area and said central part being bent at a small angle $\alpha$ relative to one another to form intersecting planes with a bend line therebetween, such that said second end area and said central part are together flexible relative to said first end area to define a nearly fully stretched leaf spring; and,
        an extension of said central part bent at an angle $\beta$ of approximately 180° to extend in a resilient condition generally parallel to said central part between said end areas, and substantially perpendicular to said nearly fully stretched leaf spring, to define a U-shaped leaf spring, said extension having a surface facing said drive chassis for receiving said magnetic head;
    magnetic head height adjustment means disposed on said drive chassis and rigidly engaging said first end area;
    magnetic head inclination adjustment means disposed on said central part and said extension for adjusting said angle $\beta$; and,
    magnetic head azimuth adjusting means disposed on said drive chassis for adjusting said angle $\alpha$ by urging said second end area into a position against resilient action of said nearly fully stretched leaf spring.

2. A mounting arrangement according to claim 1, wherein said angle $\alpha$ has an adjustment range of approximately 1°–3°.

3. A mounting arrangement according to claim 1, wherein said angle $\beta$ has an adjustment range of approximately 180°±3°.

4. A mounting arrangement according to claim 1, wherein said magnetic head height adjustment means comprises:
    a hollow cylindrical guide;
    a sliding element disposed in said hollow cylindrical guide and projecting therefrom to engage said first end area;
    a stressed compression spring disposed in said hollow cylindrical guide for urging said sliding element and said carrier plate away from said drive chassis; and,
    an adjustable stop for preventing movement of said carrier plate away from said drive chassis.

5. A mounting arrangement according to claim 4, comprising a bearing block for a capstan shaft, said hollow cylindrical guide being disposed in said bearing block.

6. A mounting arrangement according to claim 5, wherein said adjustable stop comprises:
    a bracket projecting from said bearing block, having a threaded hole therein with an axis substantially parallel to the longitudinal axis of said hollow cylindrical guide; and,
    a stud screw mounted in said threaded hole and adapted to press against said first end area of said carrier plate.

7. A mounting arrangement according to claim 6, wherein said bearing block, said bracket and said hollow cylindrical guide are formed as an integral component.

8. A mounting arrangement according to claim 1, wherein said magnetic head azimuth adjusting means comprises:
    said second end area having a hole;
    a tape deflection pin mounted on said drive chassis and having a threaded end section projecting through said hole; and,
    a nut mounted on said threaded end section and pressably urging said second end area toward said drive chassis against resilient action of said nearly fully stretched leaf spring.

* * * * *